United States Patent
Katsuyama

(10) Patent No.: US 9,120,469 B2
(45) Date of Patent: Sep. 1, 2015

(54) VEHICLE BEHAVIOR CONTROL APPARATUS

(75) Inventor: Etsuo Katsuyama, Susono (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 0 days.

(21) Appl. No.: 14/355,136

(22) PCT Filed: Nov. 10, 2011

(86) PCT No.: PCT/JP2011/075899
§ 371 (c)(1),
(2), (4) Date: Apr. 29, 2014

(87) PCT Pub. No.: WO2013/069126
PCT Pub. Date: May 16, 2013

(65) Prior Publication Data
US 2014/0309902 A1   Oct. 16, 2014

(51) Int. Cl.
*G06F 19/00* (2011.01)
*B60T 8/1755* (2006.01)
*B60W 10/08* (2006.01)
*B60W 10/184* (2012.01)
*B60W 10/22* (2006.01)
*B60W 30/20* (2006.01)
*B60W 30/02* (2012.01)
*B60W 30/04* (2006.01)

(52) U.S. Cl.
CPC .............. *B60T 8/1755* (2013.01); *B60W 10/08* (2013.01); *B60W 10/184* (2013.01); *B60W 10/22* (2013.01); *B60W 30/02* (2013.01); *B60W 30/20* (2013.01); *B60G 2300/50* (2013.01); *B60G 2400/0522* (2013.01); *B60G 2400/102* (2013.01); *B60G 2500/106* (2013.01); *B60G 2800/014* (2013.01); *B60G 2800/164* (2013.01); *B60T 2260/06* (2013.01); *B60W 2030/041* (2013.01); *B60W 2520/16* (2013.01); *B60W 2710/083* (2013.01); *B60W 2720/16* (2013.01)

(58) Field of Classification Search
None
See application file for complete search history.

(56) References Cited

U.S. PATENT DOCUMENTS

2006/0076740 A1   4/2006   Sugiyama

FOREIGN PATENT DOCUMENTS

| JP | A-2006-109642 | 4/2006 |
| JP | A-2007-118898 | 5/2007 |
| JP | A-2007-161032 | 6/2007 |
| JP | A-2008-189008 | 8/2008 |
| JP | A-2009-184522 | 8/2009 |
| JP | A-2011-031739 | 2/2011 |

*Primary Examiner* — Thomas Tarcza
*Assistant Examiner* — Garrett Evans
(74) *Attorney, Agent, or Firm* — Oliff PLC

(57) ABSTRACT

An electronic control unit determines driving force that is generated on wheels and has an identical absolute value and opposite directions to each other in order to suppress pitch behavior and/or heave behavior occurring on a vehicle body in association with travelling of a vehicle. Then, the unit controls the drive of in-wheel motors through an inverter based on the driving force. On the other hand, electronic control unit changes the damping forces of shock absorbers constituting suspension mechanisms in response to the pitch behavior and/or the heave behavior occurring on the vehicle body. In this way, by controlling one of the pitch behavior and the heave behavior that may occur in combination, enhancing of the occurrence of the other one that is not intended can be prevented effectively, and the occurrence of intended behavior on the vehicle body can be controlled independently.

10 Claims, 6 Drawing Sheets

VEHICLE BEHAVIOR CONTROL APPARATUS

TECHNICAL FIELD

The present invention relates to a vehicle behavior control apparatus that independently controls driving force or braking force generated on wheels of a vehicle in response to behavior occurring on a vehicle body of the vehicle.

BACKGROUND ART

Recently, as one form of electric vehicles, a so-called in-wheel motor type vehicle is developed in which a motor is disposed inside a wheel under a spring or in the vicinity of the wheel and the wheel is directly driven by the motor. In the in-wheel motor type vehicle, the motor disposed in each wheel is independently controlled for rotation, that is, the drive (power running) control or regenerative control of each motor is independently performed, and thus the driving force or the braking force provided to each wheel can separately be controlled in response to the travelling state of the vehicle.

With regard to such an in-wheel motor type vehicle, for example, a patent document 1 described below discloses a braking and driving force control apparatus for a vehicle in which the driving force or the braking force to be provided to each wheel is calculated in response to an average sprung displacement and an average sprung speed of the vehicle body, the calculated driving force or braking force is separately applied to the driving force in each wheel during travelling, and thus bouncing of the vehicle body is suppressed.

Additionally, a patent document 2 described below discloses a running system that suppresses behavior change of the vehicle caused by load change above a spring of a suspension device by using an instantaneous rotation angle of a front wheel suspension device and an instantaneous rotation angle of a rear wheel suspension device to calculate front wheel driving force distribution and rear wheel driving force distribution for suppressing the bouncing and calculate the front wheel driving force distribution and the rear wheel driving force distribution for suppressing the pitching.

A patent document 3 described below discloses a vibration suppression device for a vehicle that prevents energy efficiency from decreasing during the suppression of vertical vibrations on the vehicle body by prohibiting at least one of a bouncing suppression control and a pitching suppression control in a case where the braking force is applied to the front wheel or the rear wheel.

Furthermore, a patent document 4 described below discloses a braking and driving force control apparatus for a vehicle that applies different braking and driving forces to each wheel and reduces a pitch moment generated about the center of gravity in order to suppress the vertical vibrations of the vehicle in association with the pitch behavior occurring when the vehicle passes irregularities and the like on a road surface.

PRIOR ART DOCUMENT

Patent Documents

Patent Document 1: Japanese Patent Application Publication No. 2006-109642 (JP 2006-109642 A)
Patent Document 2: Japanese Patent Application Publication No. 2007-161032 (JP 2007-161032 A)
Patent Document 3: Japanese Patent Application Publication No. 2009-184522 (JP 2009-184522 A)
Patent Document 4: Japanese Patent Application Publication No. 2007-118898 (JP 2007-118898 A)

SUMMARY OF THE INVENTION

Incidentally, in a case where the driving force or the braking force generated on each wheel is separately (independently) controlled and the behavior of the vehicle body is controlled, for example, the driving force or the braking force is generated on the side of the front wheel and the braking force or the driving force is generated on the side of the side of the rear wheel, force in vertical direction (vertical force) is exerted on the vehicle body, and thus the behavior occurring on the vehicle body is controlled. In this case, for example, against the behavior in rolling direction occurring on the vehicle body of the vehicle in a turning state, the rolling behavior can independently be controlled by exerting reversed vertical forces on the vehicle body in horizontal direction of the vehicle.

However, because vertical behaviors occurring on the vehicle body, that is, bouncing behavior (heave behavior) and pitch behavior, both are behaviors occurring in combination in the vertical direction of the vehicle body, there is a possibility that controlling one behavior affects the other behavior and results in enhancement of the occurrence of the other behavior. That is, generally, in the vehicle, right and left front wheels and right and left rear wheels are supported to the vehicle body by the suspension device (suspension mechanism) that connects the unsprung wheels and the sprung vehicle body. In this case, when the driving force or the braking force is generated on each wheel as described above and the vertical force is exerted on the vehicle body, the vertical force is generated on the side of each wheel and acts on the vehicle body through the suspension device (suspension mechanism). Generally, the suspension device (suspension mechanism) is disposed such that the characteristics (for example, the position of instantaneous center of rotation in the suspension mechanism and the like) differ between the front wheel side and the rear wheel side from the standpoint of riding comfort, braking attitude, or the like. As a result, the magnitude of the vertical force generated on the wheel side and acting on (transmitted to) the vehicle body may vary in some cases.

Thus, when the same magnitude of the driving force or the braking force, for example, is generated on each of the front wheel side and the rear wheel side in order not to allow the travelling vehicle to generate unnecessary acceleration in forward and backward direction of the vehicle, there is a possibility that intended behavior of the vehicle body cannot be achieved by the control because the magnitude of the vertical force acting on the vehicle body differs due to the difference in the characteristics of the suspension mechanism described above. Specifically, for example, when the vertical force is exerted on the vehicle body in order to suppress the bouncing behavior (heave behavior), unintended pitch behavior may occur on the vehicle body because the magnitude of the acting vertical force differs (becomes uneven) between the front wheel side and the rear wheel side.

The present invention is intended to solve the above problems, and its object is to provide a vehicle behavior control apparatus that independently controls the driving force or the braking force generated on the wheels of the vehicle and appropriately controls the magnitude of the vertical force acting on the vehicle body in response to the behavior occurring on the vehicle body of the vehicle.

In order to achieve the foregoing objects, the features of the present invention is directed to a vehicle behavior control apparatus comprising: braking and driving force generating mechanisms that generate driving force or braking force independently on at least a front wheel and a rear wheel of a vehicle; suspension mechanisms that respectively connect the front wheel and the rear wheel disposed under springs of the vehicle to a vehicle body disposed above the springs of the vehicle; and control means that controls the braking and driving force generating mechanisms in response to behavior occurring on the vehicle body to generate specified driving force or braking force independently on the front wheel and the rear wheel, in which the suspension mechanisms include: shock absorbers that damp vibrations transmitted from a road surface to the vehicle body through the front wheel and the rear wheel; and damping force changing means that change damping force of the shock absorbers, and the control means: controls the braking and driving force generating mechanisms in response to the behavior occurring on the vehicle body and generates the specified driving force or braking force independently on the front wheel and the rear wheel, and controls the damping force changing means in response to the behavior occurring on the vehicle body and changes the damping force of the shock absorbers to specified damping force. In this case, for example, the control means can control the braking and driving force generating mechanisms in response to the behavior of the vehicle body and generates the driving force or the braking force having an identical absolute value and opposite directions of action independently on each of the front wheels and the rear wheels. In this case, the braking and driving force generating mechanisms can employ, for example, motors that are each assembled to the front wheel and the rear wheel of the vehicle and independently generate the driving force or the braking force.

In this case, the suspension mechanisms is to connect respective right and left front wheels and right and left rear wheels of the vehicle to the vehicle body through the shock absorbers, and the control means may: control the braking and driving force generating mechanisms in order to suppress the behavior occurring on the vehicle body and generates the specified driving force or braking force independently on the front wheels and the rear wheels; and control the damping force changing means in accordance with distribution of the specified driving force or braking force generated on the front wheels and the rear wheels by the braking and driving force generating mechanisms and changes the damping force of the shock absorbers to the specified damping force.

In this case, the control means may: control the braking and driving force generating mechanisms in order to suppress the behavior occurring on the vehicle body and generates the specified driving force or braking force independently on the front wheels and the rear wheels; and control the damping force changing means for one of the shock absorbers connecting the front wheels to the vehicle body and the shock absorbers connecting the rear wheels to the vehicle body in accordance with distribution of the specified driving force or braking force generated on the front wheels and the rear wheels by the braking and driving force generating mechanisms and changes the damping force of the shock absorbers to the specified damping force.

In those cases, the control means may: control the damping force changing means in accordance with the magnitude of vertical forces in vehicle vertical directions acting on the vehicle body through the suspension mechanisms as components of the specified driving force or braking force generated on the front wheels and the rear wheels by controlling the braking and driving force generating mechanisms; and change the damping force of the shock absorbers to the specified damping force.

More specifically, in this case, the control means can: control the braking and driving force generating mechanisms in order to suppress pitch behavior that is, for example, the behavior with vertical motion occurring on the vehicle body and in which the direction of vertical displacement of the vehicle body on the side of the front wheels and the direction of vertical displacement on the side of the rear wheels are opposite to each other; and, when the specified driving force or braking force is generated independently on the front wheels and the rear wheels, control the damping force changing means so as to increase the damping force of the shock absorber in the suspension mechanism transmitting the vertical force having relatively small magnitude and controls the damping force changing means so as to reduce the damping force of the shock absorber in the suspension mechanism transmitting the vertical force having relatively large magnitude, among the suspension mechanisms transmitting the vertical force acting on the vehicle body. Furthermore, the control means can: control the braking and driving force generating mechanisms in order to suppress heave behavior that is, for example, the behavior with vertical motion occurring on the vehicle body and in which the direction of vertical displacement of the vehicle body on the side of the front wheels and the direction of vertical displacement on the side of the rear wheels are identical with each other; and, when the specified driving force or braking force is generated independently on the front wheels and the rear wheels, control the damping force changing means so as to reduce the damping force of the shock absorber in the suspension mechanism transmitting the vertical force having relatively small magnitude and controls the damping force changing means so as to increase the damping force of the shock absorber in the suspension mechanism transmitting the vertical force having relatively large magnitude, among the suspension mechanisms transmitting the vertical force acting on the vehicle body.

According to the foregoing features, in response to the behavior of the vehicle body, specifically, in order to suppress the pitch behavior or the heave behavior occurring on the vehicle body, the control means can control the braking and driving force generating mechanisms and generate specified driving force or braking force independently on the front wheels and the rear wheels (more specifically, right and left front wheels and right and left rear wheels). This allows the control means to generate the vertical forces acting on the vehicle body from the front wheels and the rear wheels (right and left front wheels and right and left rear wheels) in response to the behavior of the vehicle body (pitch behavior or heave behavior).

On the other hand, the control means can change the damping force of the shock absorber that damps the vibrations transmitted from the road surface to the vehicle body through the front wheels and the rear wheels (right and left front wheels and right and left rear wheels) to the specified damping force in response to, for example, the behavior of the vehicle body (specifically, pitch behavior or heave behavior occurring on the vehicle body) or the magnitude of the vertical force. In this way, the control means can appropriately control the magnitude of the vertical forces acting on the vehicle body through the shock absorbers in the suspension mechanisms and can consequently control the vertical displacement in the vehicle body.

Specifically, when suppressing the pitch behavior, the control means can control the damping force changing means so as to increase the damping force of the shock absorber exerting (transmitting) the vertical force having relatively small magnitude on (to) the vehicle body and conversely control the damping force changing means so as to reduce the damping force of the shock absorber exerting (transmitting) the vertical force having relatively large magnitude on (to) the vehicle body. In this way, in the vehicle body requiring the pitch control, the vertical displacement on the side on which the vertical force having smaller magnitude acts can be reduced, and the vertical displacement on the side on which the vertical force having larger magnitude acts can be increased. As a result, for example, an appropriate pitch moment can be generated on the vehicle body.

Specifically, when suppressing the heave behavior, the control means can control the damping force changing means so as to reduce the damping force of the shock absorber exerting (transmitting) the vertical force having relatively small magnitude on (to) the vehicle body and conversely control the damping force changing means so as to increase the damping force of the shock absorber exerting (transmitting) the vertical force having relatively large magnitude on (to) the vehicle body. In this way, in the vehicle body requiring the heave control, the vertical displacement on the side on which the vertical force having smaller magnitude acts can be enhanced, and the vertical displacement on the side on which the vertical force having larger magnitude acts can be suppressed. As a result, for example, the vertical displacements of the vehicle body can be made approximately identical.

Therefore, in the situation where the driving forces (braking forces) having the identical absolute value and the opposite directions of action are generated on the side of the front wheels and the side of the rear wheels and the behavior of the vehicle body is controlled, even when the differences in the magnitude of the vertical force generated on the front wheels and the rear wheels arise due to the characteristics of the suspension mechanisms, the control means can appropriately change the magnitude of the damping force of the shock absorbers in accordance with the magnitude of the vertical forces. In this way, by controlling one of the behaviors occurring in combination (for example, the heave behavior), enhancing of the occurrence of the other one (for example, the pitch behavior) that is not intended can be prevented effectively, and the occurrence of intended behavior (aimed behavior) can be made on the vehicle body. That is, even when the behaviors interact with each other, the intended behavior (aimed behavior) can be controlled independently.

MODES FOR CARRYING OUT THE INVENTION

Figure 1:
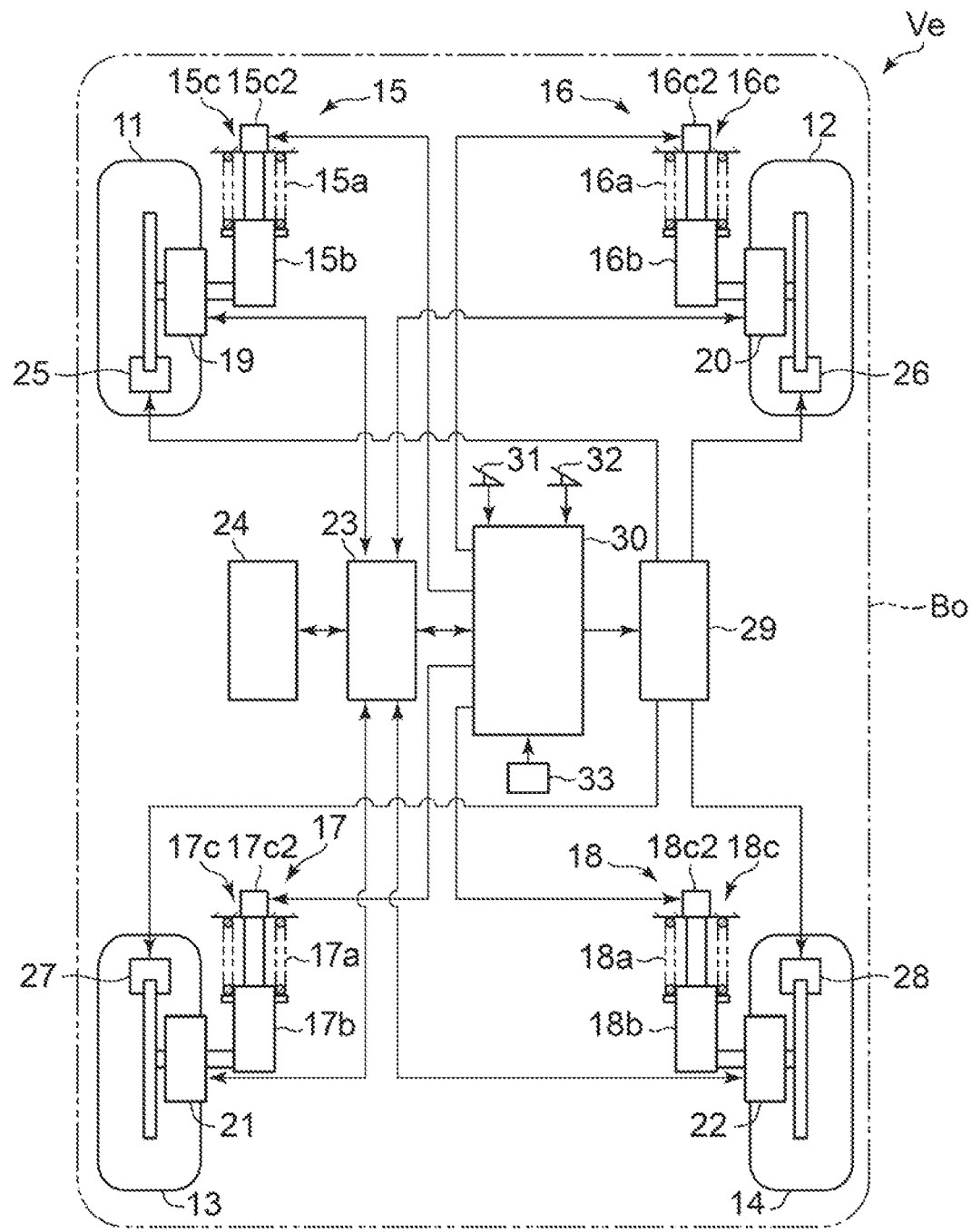
FIG. 1 is a schematic diagram that schematically shows the structure of a vehicle to which the vehicle behavior control apparatus according to the present embodiment is applicable.

A detailed description will hereinafter be made on embodiments of the present invention with reference to the accompanying drawings. FIG. 1 schematically shows the structure of a vehicle Ve that is equipped with the vehicle behavior control apparatus according to the present embodiment.

The vehicle Ve includes right and left front wheels 11, 12 and right and left rear wheels 13, 14 that constitute unsprung members. Each of the right and left front wheels 11, 12 is independently supported by a vehicle body Bo that constitutes sprung members of the vehicle Ve via suspension mechanisms 15, 16. Additionally, each of the right and left rear wheels 13, 14 is independently supported by the vehicle body Bo of the vehicle Ve via the suspension mechanisms 17, 18.

The suspension mechanisms 15 to 18 include, as shown in FIG. 1, suspension springs 15a to 18a, shock absorbers 15b to 18b, and variable restriction mechanisms 15c to 18c. Here, well-known structures (such as a strut type suspension or a wishbone type suspension, for example) can be employed for the structure (type) of the suspension mechanisms 15 to 18, and thus the description is not made thereon hereafter. Furthermore, the suspension mechanisms 15 to 18 each have the same structure, and thus the following description is made on the suspension mechanism 15 as a typical example.

Figure 2:
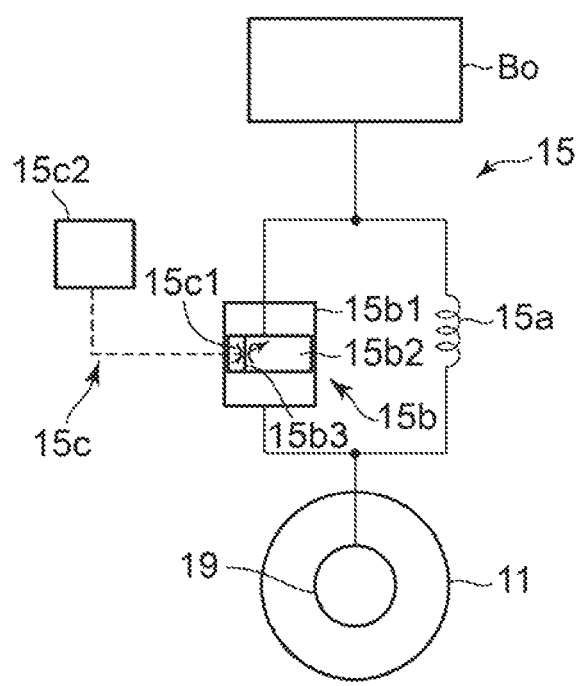
FIG. 2 is a schematic diagram that shows the structure of the suspension mechanism in FIG. 1.

The suspension spring 15a absorbs vibrations transmitted from a road surface to the vehicle body Bo through the left front wheel 11, as shown in FIG. 1 and FIG. 2, and employs a coil spring made of metal, an air spring, and the like. The shock absorber 15b is arranged in parallel with the suspension spring 15a, as shown in FIG. 1 and FIG. 2, and damps the vibrations transmitted from the road surface to the vehicle body Bo through the left front wheel 11. Additionally, the variable restriction mechanism 15c is assembled to the shock absorber 15b and configured such that the damping force of the shock absorber 15b is variable. Specifically, as schematically shown in FIG. 2, the variable restriction mechanism 15c includes a valve 15c1 and an actuator 15c2. When the valve opening OP of the valve 15c1 is changed, for example, in a stepwise manner (or in a linear manner) through the actuator 15c2, a flow passage cross sectional area of a communication passage 15b3 disposed in a piston 15b2 relatively displaced in viscous fluid filled in a cylinder 15b1 constituting the shock absorber 15b is changed in a stepwise manner (or in a linear manner). The drag force when the viscous fluid flows in the communication passage 15b3 is also changed in a stepwise manner (or in a linear manner) accordingly. As a result, the magnitude of damping force of the shock absorber 15b (more specifically, a damping coefficient representing the magnitude of damping force) is changed in a stepwise manner (or in a linear manner).

As shown in FIG. 1, motors 19, 20 are incorporated into the inside of the right and left front wheels 11, 12, and motors 21, 22 are incorporated into the inside of the right and left rear wheels 13, 14. Those motors are respectively connected to the right and left front wheels 11, 12 and the right and left rear wheels 13, 14 so as to be capable of power transmission. That is, the motors 19 to 22 are so-called in-wheel motors 19 to 22 and constitute the unsprung members of the vehicle Ve together with the right and left front wheels 11, 12 and the right and left rear wheels 13, 14. By independently controlling the rotation of each of the in-wheel motors 19 to 22, driving force and braking force generated on the right and left front wheels 11, 12 and the right and left rear wheels 13, 14 can be controlled independently.

Each of these in-wheel motors 19 to 22 is constituted by an alternating-current (AC) synchronous motor, for example. Direct-current (DC) power from an electric storage device 24 such as a battery or a capacitor is converted into AC power through an inverter 23, and the AC power is supplied to each of the in-wheel motors 19 to 22. The drive (or power running) of the in-wheel motors 19 to 22 is controlled accordingly, and the in-wheel motors 19 to 22 provide electromagnetic driving force to the right and left front wheels 11, 12 and the right and left rear wheels 13, 14.

The in-wheel motors 19 to 22 can also use the rotational energy of the right and left front wheels 11, 12 and the right and left rear wheels 13, 14 to carry out regenerative control. Thus, when the in-wheel motors 19 to 22 regenerate or generate the electric power, the rotational (kinetic) energy of the right and left front wheels 11, 12 and the right and left rear wheels 13, 14 is converted into electrical power by the in-wheel motors 19 to 22, and the electric power generated at that time (regenerative electric power) is stored in the electric storage device 24 through the inverter 23. At this time, the in-wheel motors 19 to 22 provide electromagnetic braking force based on regenerative power generation to the right and left front wheels 11, 12 and the right and left rear wheels 13, 14.

Furthermore, braking mechanisms 25, 26, 27, 28 are respectively disposed between the wheels 11 to 14 and the in-wheel motors 19 to 22 corresponding to the respective wheels. Each of the braking mechanisms 25 to 28 is a well-known braking device such as a disk brake or a drum brake, for example. The braking mechanisms 25 to 28 are connected to a brake actuator 29 that hydraulically actuates pistons and brake shoes of brake calipers (both not illustrated in the drawing) for generating the braking force on the wheels 11 to 14 by hydraulic pressure forcibly fed by a master cylinder which is not illustrated in the drawing, for example.

The actuators 15c2 to 18c2 of the variable restriction mechanisms 15c to 18c, the inverter 23, and the brake actuator 29 are connected to an electronic control unit 30 that controls the damping force (damping coefficient) of the suspension mechanisms 15 to 18 (more specifically, shock absorbers 15b to 18b), rotational states of the in-wheel motors 19 to 22, operating states of the braking mechanisms 25 to 28, and the like. Thus, the variable restriction mechanisms 15c to 18c constitute damping force changing means of the present invention, the in-wheel motors 19 to 22, the inverter 23, and the electric storage device 24 constitute a braking and driving force generating mechanism of the present invention, and the electronic control unit 30 constitutes control means of the present invention.

The electronic control unit 30 has a microcomputer that is formed with a CPU, a ROM, a RAM, and the like as main component parts and executes various programs to control the operation of the variable restriction mechanisms 15c to 18c, the in-wheel motors 19 to 22, and the braking mechanisms 25 to 28. Thus, the electronic control unit 30 receives a signal from the inverter 23 and signals from various sensors including an accelerator pedal sensor 31 for detecting an accelerator operation amount of a driver by a depressing amount (or angle or pressure) of an accelerator pedal, a brake pedal sensor 32 for detecting a brake operation amount of the driver by the depressing amount (or angle or pressure) of a brake pedal, and a motion state detecting sensor 33 for detecting a motion state quantity of the vehicle body Bo (vehicle Ve) which includes a vertical acceleration sensor for detecting vertical acceleration of the vehicle body Bo (vehicle Ve) in vertical direction, a pitch rate sensor for detecting a pitch rate generated on the vehicle body Bo (vehicle Ve), and the like.

As described above, the electronic control unit 30 is connected to the aforementioned sensors 31 to 33 and the inverter 23 to receive the respective signals, and thus the electronic control unit 30 can capture and control a traveling state of the vehicle Ve and behavior of the vehicle body Bo.

Specifically, the electronic control unit 30 can compute required driving force and required braking force in proportion to the accelerator operation amount and the brake operation amount of the driver based on the signals input from the accelerator pedal sensor 31 and brake pedal sensor 32, that is, total driving force for causing the vehicle Ve to travel or to be braked. The electronic control unit 30 can also compute respective output torques of the in-wheel motors 19 to 22 (motor torque) based on the signal input from the inverter 23 (for example, signals representative of the amount of electric power or current value supplied during power running control of the in-wheel motors 19 to 22).

This allows the electronic control unit 30 to output the signal for controlling the rotation of each of the in-wheel motors 19 to 22 through the inverter 23 and the signal for controlling the operation of each of the braking mechanisms 25 to 28 through the brake actuator 29. Thus, the electronic control unit 30 can control the traveling state of the vehicle Ve by determining the total driving force required for the vehicle Ve based on the signals input from the accelerator sensor 31 and brake sensor 32 and outputting the signal for controlling the power running or regenerative state of the in-wheel motors 19 to 22 and the operation of the brake actuator 29, that is, the braking mechanisms 25 to 28 so as to generate the total driving force.

Furthermore, the electronic control unit 30 can detect vertical vibration behavior (heave behavior) and pitch behavior generated on the vehicle body Bo based on the signal input from the motion state detecting sensor 33 (for example, the vertical acceleration, the pitch rate, or the like of the vehicle body Bo). The electronic control unit 30 then changes the driving force (or braking force) generated on the side of the right and left front wheels 11, 12 and the driving force (or braking force) generated on the side of the right and left rear wheels 13, 14 within the total driving force required to the travelling of the vehicle Ve in order to suppress the behavior on the vehicle body Bo depending on the state of the detected heave behavior and/or pitch behavior.

In other words, the electronic control unit 30 changes the driving force (or braking force) generated on the side of the right and left front wheels 11, 12 and the driving force (or braking force) generated on the side of the right and left rear wheels 13, 14 to generate vertical force acting on the vehicle body Bo in vertical direction at the location of the respective wheels 11 to 14. As a result, the heave behavior and/or pitch behavior generated on the vehicle body Bo can be suppressed, or in other words, vertical displacement (vertical motion) of the vehicle body Bo can be suppressed.

Incidentally, when the driving force (or braking force) generated on the side of the right and left front wheels 11, 12 and the driving force (or braking force) generated on the side of the right and left rear wheels 13, 14 are changed depending on the state of the heave behavior generated on the vehicle body Bo in order to suppress the heave behavior (vertical vibration), for example, the pitch behavior may occur in some cases due to the vertical force acting on the vehicle body Bo with the change. Conversely, when the driving force (or braking force) generated on the side of the right and left front wheels 11, 12 and the driving force (or braking force) generated on the side of the right and left rear wheels 13, 14 are changed depending on the state of the pitch behavior occurring on the vehicle body Bo in order to suppress the pitch behavior, the heave behavior may occur in some cases due to the vertical force acting on the vehicle body Bo with the change. That is, the heave behavior and the pitch behavior may arise in combination in some cases from the action of the vertical force on the vehicle body Bo with the control for suppressing one of the behaviors. A specific description is made blow on the phenomenon described above. The control itself for changing each of the driving force (or braking force) generated on the side of the right and left front wheels 11, 12 and the driving force (or braking force) generated on the side of the right and left rear wheels 13, 14 and suppressing the heave behavior and the pitch behavior is not directly related to the present invention, and the details of any known controls can be employed. Thus, its detailed description is not made here.

Now, it is supposed that the pitch behavior occurs on the vehicle body Bo and a control for suppressing the occurring pitch behavior (hereinafter, referred to as a pitch control) is carried out. For suppressing such pitch behavior occurring on the vehicle body Bo, the pitch control can be employed to generate pitch moment on the vehicle body Bo, for example. In this case, it is supposed that the directions of the driving forces (or braking forces) generated on the side of the right and left front wheels 11, 12 and the side of the right and left rear wheels 13, 14 are opposite to each other and the absolute values thereof are identical with each other in order to premise that no influence is exerted on forward and backward motion of the vehicle Ve, or in other words, no acceleration or deceleration is generated in the vehicle Ve. This results in cancelling of the driving forces (or braking forces) generated on the side of the right and left front wheels 11, 12 and the side of the right and left rear wheels 13, 14 each other, and therefore the total driving force required to drive the vehicle Ve can be prevented from decreasing.

Figure 3:
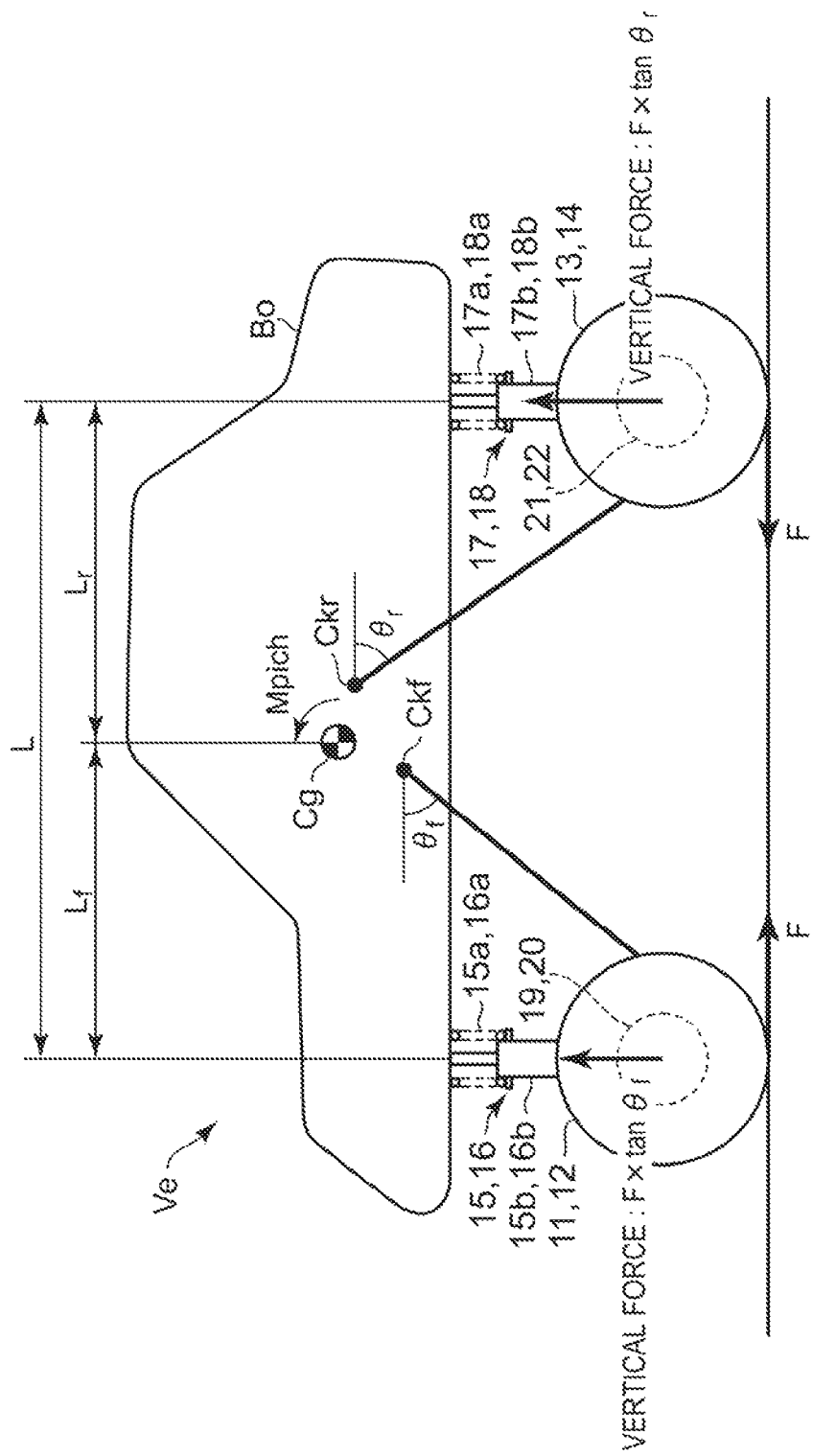
FIG. 3 is a diagram that illustrates the force generated when the pitch control and the heave control are performed on the vehicle in FIG. 1.

In the exemplified pitch control, as schematically shown in FIG. 3, it is supposed that the distance between the center of the gravity Cg of the vehicle Ve and an axle of the right and left front wheels 11, 12 in forward and backward direction of the vehicle Ve with respect to the wheel base L of the vehicle Ve is Lf, the distance between the center of the gravity Cg of the vehicle Ve and an axle of the right and left rear wheels 13, 14 with respect to the wheel base L is Lr, an instantaneous rotation angle at an instantaneous center of rotation Ckf for the suspension mechanisms 15, 16 of the right and left front wheels 11, 12 is θf (estimate), and an instantaneous rotation angle at an instantaneous center of rotation Ckr for the suspension mechanisms 17, 18 of the right and left rear wheels 13, 14 is θr (estimate). The driving forces F (or braking forces F) having the identical absolute value and the opposite direction to each other are generated on the side of the right and left front wheels 11, 12 and the side of the right and left rear wheels 13, 14, and thus the specified pitch moment Mpich is generated at the center of the gravity Cg of the vehicle Ve.

In FIG. 3, the condition is exemplarily shown in which the right and left front wheels 11, 12 generate the driving force F (negative value) corresponding to the braking force with respect to the driving force F (positive value) generated on the side of the right and left rear wheels 13, 14; however, it is understood that there is another condition in which the right and left rear wheels 13, 14 generate the driving force F (negative value) corresponding to the braking force with respect to the driving force F (positive value) generated on the side of the right and left front wheels 11, 12. Furthermore, in FIG. 3, from the standpoint of riding comfort, braking attitude, or the like, the condition is exemplarily shown in which the degree of the instantaneous rotation angle θf for the suspension mechanisms 15, 16 of the right and left front wheels 11, 12 is smaller than the degree of the instantaneous rotation angle θr for the suspension mechanisms 17, 18 of the right and left rear wheels 13, 14; however, it is understood that there is another condition in which the degree of the instantaneous rotation angle θr for the suspension mechanisms 17, 18 is smaller than the degree of the instantaneous rotation angle θf for the suspension mechanisms 15, 16.

As described above, when the driving forces F having the directions opposite to each other are generated on the right and left front wheels 11, 12 and the right and left rear wheels 13, 14, the vertical component of the driving force F acting on the vehicle body Bo from the side of the right and left front wheels 11, 12 is expressed by using the instantaneous rotation angle θf for the suspension mechanisms 15, 16 as F×tan θf, and the vertical component of the driving force F acting on the vehicle body Bo from the side of the right and left rear wheels 13, 14 is expressed by using the instantaneous rotation angle θr for the suspension mechanisms 17, 18 as F×tan θr. By using those values, the pitch moment Mpich generated at the center of the gravity Cg of the vehicle Ve can be calculated with the distances Lf, Lr by the following equation 1.

$$Mpich = F \times (Lr \times \tan\theta r - Lf \times \tan\theta f) \quad \text{Equation 1}$$

Therefore, the electronic control unit 30 can generate the specified pitch moment Mpich to suppress the pitch behavior by controlling the driving forces F generated on the wheels 11 to 14, or in other words, by controlling the drive of the in-wheel motors 19 to 22 through the inverter 23. In this case, the electronic control unit 30 can also generate the driving force F (negative value) corresponding to the braking force on the wheels 11 to 14 by controlling the braking of the braking mechanisms 25 to 28 through the brake actuator 29 in place of or in addition to controlling the drive of the in-wheel motors 19 to 22 through the inverter 23.

On the other hand, when the specified pitch moment Mpich described above is generated and the pitch control is performed, F×tan θf and F×tan θr that are the vertical components of the driving force F are input from the right and left front wheels 11, 12 and the right and left rear wheels 13, 14 to the vehicle body Bo as the vertical forces. Thus, there is a case where the heave behavior occurs in the vehicle body Bo due to the input of F×tan θf and F×tan θr to the vehicle body Bo as described above.

On this account, the electronic control unit 30 obtains the signal representative of the vertical acceleration of the vehicle body Bo in the signals received from the motion state detecting sensor 33. The electronic control unit 30 then performs the drive control of the magnitude of the driving force F, that is, a heave control based on the magnitude and the direction of the vertical acceleration represented by the obtained signal so that the vertical acceleration is not increased by the action of the vertical forces (F×tan θf and F×tan θr) on the vehicle body Bo. In this way, it becomes possible to suppress the heave behavior in any case including the case where the heave behavior occurs in association with the pitch control.

Incidentally, in the situation where the directions of the driving forces F (or braking forces F) generated on the side of the right and left front wheels 11, 12 and the side of the right and left rear wheels 13, 14 are opposite to each other and the absolute values thereof are identical with each other, for example, as shown in FIG. 3, when the degree of the instantaneous rotation angle θf for the suspension mechanisms 15, 16 of the right and left front wheels 11, 12 is smaller than the degree of the instantaneous rotation angle θr for the suspension mechanisms 17, 18 of the right and left rear wheels 13, 14, the magnitude of F×tan θf input from the side of the right and left front wheels 11, 12 becomes smaller than the magnitude of F×tan θr input from the side of the right and left rear wheels 13, 14. Conversely, in the situation where the degree of the instantaneous rotation angle θr for the suspension mechanisms 17, 18 is smaller than the degree of the instantaneous rotation angle θf for the suspension mechanisms 15, 16, the magnitude of F×tan θr input from the side of the right and left rear wheels 13, 14 becomes smaller than the magnitude of F×tan θf input from the side of the right and left front wheels 11, 12.

As described above, the wheels 11 to 14 that are the unsprung members are connected to the vehicle body Bo that is the sprung member via the suspension mechanism 15 to 18 as shown in FIG. 3. Thus, F×tan θf and F×tan θr as the components of the driving forces F generated at the locations of the wheels 11 to 14, that is, the vertical forces are input to the vehicle body Bo through the shock absorbers 15b to 18b respectively constituting the suspension mechanisms 15 to 18.

In this case, if all the damping forces (damping coefficients) of the shock absorbers 15b to 18b are the same, for example, in the situation where the degree of the instantaneous rotation angle θf for the suspension mechanisms 15, 16 of the right and left front wheels 11, 12 is smaller than the degree of the instantaneous rotation angle θr for the suspension mechanisms 17, 18 of the right and left rear wheels 13, 14, the magnitude of F×tan θf input from the side of the right and left front wheels 11, 12 becomes smaller than the magnitude of F×tan θr input from the side of the right and left rear wheels 13, 14, and thus the vertical displacement of the vehicle body Bo becomes smaller on the side of the right and left front wheels 11, 12 than on the side of the right and left rear wheels 13, 14. Conversely, in the situation where the degree of the instantaneous rotation angle θf for the suspension mechanisms 15, 16 of the right and left front wheels 11, 12 is larger than the degree of the instantaneous rotation angle θr for the suspension mechanisms 17, 18 of the right and left rear wheels 13, 14, the magnitude of F×tan θf input from the side of the right and left front wheels 11, 12 becomes greater than the magnitude of F×tan θr input from the side of the right and left rear wheels 13, 14, and thus the vertical displacement of the vehicle body Bo becomes greater on the side of the right and left front wheels 11, 12 than on the side of the right and left rear wheels 13, 14. As a result, for example, the execution of the heave control described above may cause unnecessary pitch behavior in the vehicle body Bo in some cases.

On this account, by appropriately changing the damping force (damping coefficient) of the shock absorbers 15b to 18b in the suspension mechanisms 15 to 18 along with the execution of the heave control described above, the difference in the corresponding vertical displacement at the locations of the wheels 11 to 14 in the vehicle body Bo is reduced, and thus the unnecessary pitch behavior can be prevented from occurring.

Specifically, when the degree of the instantaneous rotation angle θf for the suspension mechanisms 15, 16 of the right and left front wheels 11, 12 is smaller than the degree of the instantaneous rotation angle θr for the suspension mechanisms 17, 18 of the right and left rear wheels 13, 14 and, as shown in FIG. 3, the magnitude of F×tan θf is smaller than the magnitude of F×tan θr, the damping force (damping coefficient) of the shock absorbers 15b, 16b in the suspension mechanisms 15, 16 of the right and left front wheels 11, 12 is reduced (changed to a soft side), while the damping force (damping coefficient) of the shock absorbers 17b, 18b in the suspension mechanisms 17, 18 of the right and left rear wheels 13, 14 is increased (changed to a hard side). Conversely, when the degree of the instantaneous rotation angle θr for the suspension mechanisms 17, 18 of the right and left rear wheels 13, 14 is smaller than the degree of the instantaneous rotation angle θf for the suspension mechanisms 15, 16 of the right and left front wheels 11, 12 and the magnitude of F×tan θr is smaller than the magnitude of F×tan θf, the damping force (damping coefficient) of the shock absorbers 17b, 18b in the suspension mechanisms 17, 18 of the right and left rear wheels 13, 14 is reduced (changed to the soft side), while the damping force (damping coefficient) of the shock absorbers 15b, 16b in the suspension mechanisms 15, 16 of the right and left front wheels 11, 12 is increased (changed to a hard side).

In this way, since the damping force (damping coefficient) is changed to be reduced on the side where the magnitude of the vertical force that is the component of the driving force F generated in association with the heave control is small, the vehicle body Bo is relatively easily displaced in vertical direction, and consequently the vertical displacement caused by the vertical force increases relatively. On the other hand, since the damping force (damping coefficient) is changed to be increased on the side where the magnitude of the vertical force that is the component of the driving force F generated in association with the heave control is large, the vehicle body Bo is hardly displaced in vertical direction, and consequently the vertical displacement caused by the vertical force decreases relatively. Therefore, by appropriately changing the magnitude of the damping force (damping coefficient) of each of the shock absorbers 15b to 18b, approximately the same vertical displacement of the vehicle body Bo caused by the vertical force that is the component of the driving force F can be produced on the side of the right and left front wheels 11, 12 and the side of the right and left rear wheels 13, 14, and the pitch behavior which may occur in association with the heave control can be suppressed effectively.

Furthermore, in the pitch control described above, due to a constraint of the suspension mechanisms 15 to 18 (specifically, a constraint that the instantaneous centers of rotation Ckf, Ckr may exist only on the same side with respect to the ground surface (on a ground side)), F×tan θf and F×tan θr can be acted on the side of the right and left front wheels 11, 12 and the side of right and left rear wheels 13, 14 only in the same direction that is the upward direction of the vehicle. Thus, in this case, the pitch moment Mpich caused by the difference between F×tan θf and F×tan θr acting in the upward direction of the vehicle (the same direction) is exerted, and F×tan θf and F×tan θr act as the vertical forces.

On this account, to bring the pitch moment Mpich that is actually generated in the vehicle body Bo close to an ideal pitch moment that can be generated by making different in the directions of action of the vertical F×tan θf generated on the side of the right and left front wheels 11, 12 and the vertical F×tan θr generated on the side of right and left rear wheels 13, 14, it is necessary to increase the difference between F×tan θf and F×tan θr acting in the same direction (upward direction of the vehicle) as apparent from the aforementioned equation 1. In other words, when the difference between F×tan θf and F×tan θr is not increased, the pitch moment Mpich that is actually generated in the vehicle body Bo decreases, and F×tan θf and F×tan θr easily act as the vertical forces as they are. Thus, there is a high possibility that the heave behavior occurs in association with the pitch control.

For this reason, in order to bring the pitch moment Mpich actually generated in the vehicle body Bo to the ideal pitch moment that can be generated and to suppress the occurrence of the unnecessary heave behavior, suppressing the vertical displacement of the vehicle body Bo on the side where the magnitude of the vertical force that is the component of the driving force F generated in association with the pitch control is small and enhancing the vertical displacement of the vehicle body Bo on the side where the magnitude of the vertical force that is the component of the driving force F is large prove effective.

Specifically, when the degree of the instantaneous rotation angle θf for the suspension mechanisms 15, 16 of the right and left front wheels 11, 12 is smaller than the degree of the instantaneous rotation angle θr for the suspension mechanisms 17, 18 of the right and left rear wheels 13, 14 and, as shown in FIG. 3, the magnitude of F×tan θf is smaller than the magnitude of F×tan θr, the damping force (damping coefficient) of the shock absorbers 15b, 16b in the suspension mechanisms 15, 16 of the right and left front wheels 11, 12 is increased (changed to the hard side), while the damping force (damping coefficient) of the shock absorbers 17b, 18b in the suspension mechanisms 17, 18 of the right and left rear wheels 13, 14 is reduced (changed to the soft side). Conversely, when the degree of the instantaneous rotation angle θr for the suspension mechanisms 17, 18 of the right and left rear wheels 13, 14 is smaller than the degree of the instantaneous rotation angle θf for the suspension mechanisms 15, 16 of the right and left front wheels 11, 12 and the magnitude of F×tan θr is smaller than the magnitude of F×tan θf, the damping force (damping coefficient) of the shock absorbers 17b, 18b in the suspension mechanisms 17, 18 of the right and left rear wheels 13, 14 is increased (changed to the hard side), while the damping force (damping coefficient) of the shock absorbers 15b, 16b in the suspension mechanisms 15, 16 of the right and left front wheels 11, 12 is reduced (changed to the soft side).

In this way, since the damping force (damping coefficient) is changed to be increased on the side where the magnitude of the vertical force generated in association with the pitch control is small, the vertical force acting on (transmitted to) the vehicle body Bo is relatively reduced, and the vertical displacement of the vehicle body Bo caused by the vertical force decreases relatively. On the other hand, since the damping force (damping coefficient) is changed to be reduced on the side where the magnitude of the vertical force generated in association with the pitch control is large, the vertical force acting on (transmitted to) the vehicle body Bo increases relatively, and the vertical displacement of the vehicle body Bo caused by the vertical force increases relatively.

Therefore, by appropriately changing the magnitude of the damping force (damping coefficient) of each of the shock absorbers 15b to 18b, the difference in the vertical forces that are the components of the driving forces F can relatively increase between the side of the right and left front wheels 11, 12 and the side of the right and left rear wheels 13, 14 of the vehicle body Bo (or, in other words, the difference in the vertical displacement of the vehicle body Bo can be produced appropriately), and more appropriate pitch moment Mpich can be generated. By generating such an appropriate pitch moment Mpich (that is, by appropriately producing the difference in the vertical displacement of the vehicle body Bo), the heave behavior possibly occurring in association with the pitch control can effectively be suppressed.

As described above, by cooperatively controlling the driving force F (or braking force F) in the wheels 11 to 14 by the in-wheel motors 19 to 22 (or braking mechanisms 25 to 28) and the damping force (damping coefficient) of the shock absorbers 15b to 18b in the suspension mechanisms 15 to 18 with each other in response to the behavior (motion state) of the vehicle body Bo, the behavior of the vehicle body Bo, more specifically, the heave behavior and the pitch behavior in combination with each other can be suppressed independently and appropriately. For this purpose, the electronic control unit 30 executes a driving force and damping force cooperative control program shown in FIG. 4.

Figure 4:
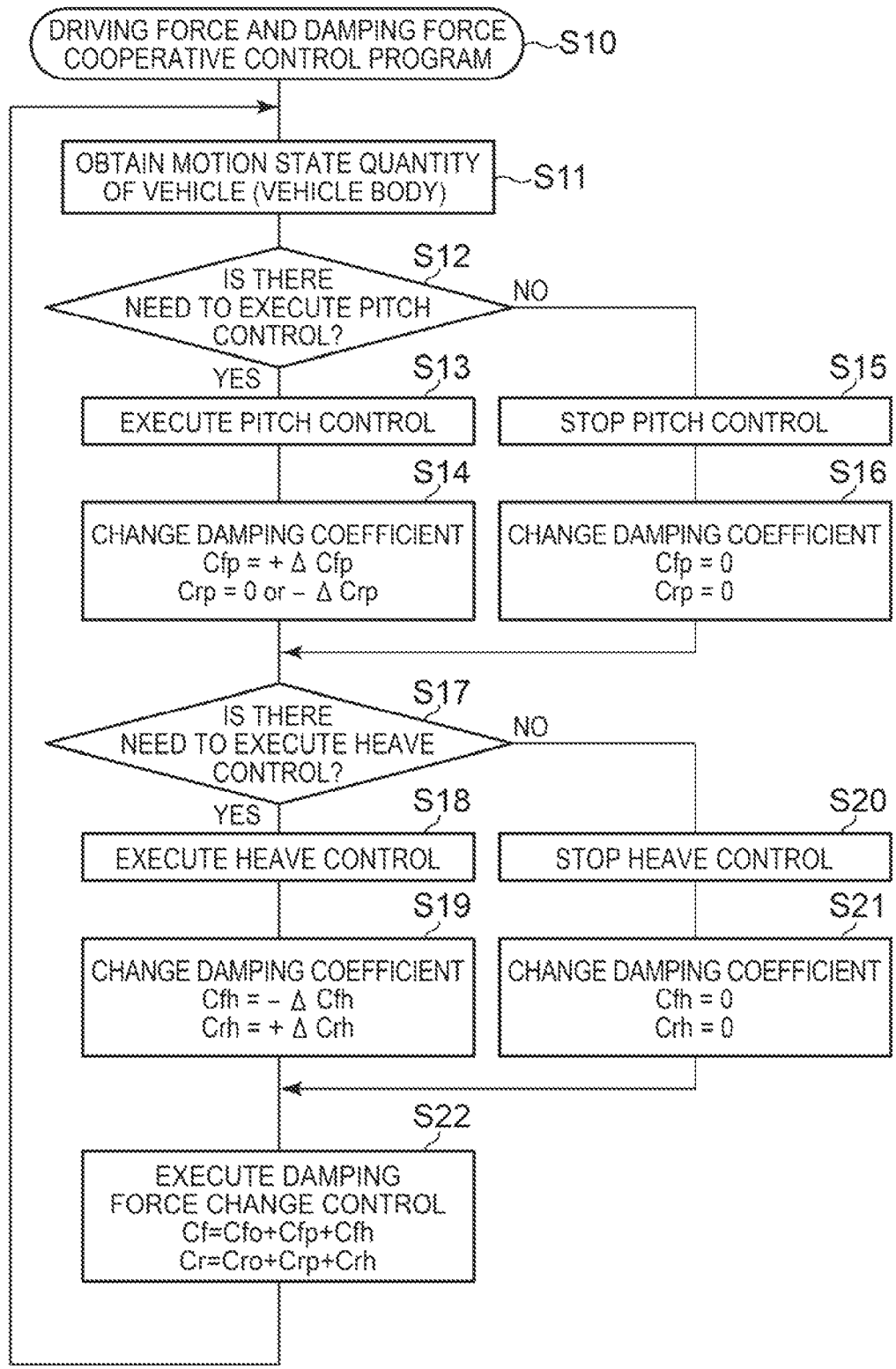
FIG. 4 is a flowchart of a driving force and damping force cooperative control program that is executed by the electronic control unit in FIG. 1.

When it is explained in concrete terms, the electronic control unit 30 (more specifically, CPU) starts the driving force and damping force cooperative control program shown in FIG. 4 in step S10 and obtains the motion state quantity of the vehicle Ve (vehicle body Bo) in the following step S 11. That is, the electronic control unit 30 obtains a vertical acceleration G generated on the vehicle Ve, that is, the vehicle body Bo and a pitch rate Θp generated on the vehicle Ve, that is, the vehicle body Bo as the motion state quantity of the vehicle Ve from at least the motion state detecting sensor 33. After obtaining the motion state quantity of the vehicle Ve, the electronic control unit 30 continues to step S12.

In this embodiment, based on the motion state quantity of the vehicle Ve obtained in the step S11, the electronic control unit 30 executes the pitch control for suppressing the pitch behavior occurring on the vehicle body Bo by following the respective step processes of step S12 to step S16 described below and executes the heave control for suppressing the heave behavior occurring on the vehicle body Bo by following the respective step processes of step S17 to step S21 described below. In this case, in the driving force and damping force cooperative control program, the execution sequence of the pitch control and the heave control is not limited to the order in which the heave control is executed after the pitch control; however, the pitch control may be executed after the heave control, or the pitch control and the heave control may be executed in parallel.

In step S12, the electronic control unit 30 determines whether or not there is a need to execute the pitch control by the driving force or the braking force in the wheels 11 to 14, specifically, the driving force or the braking force of the in-wheel motors 19 to 22 (or the braking force of the braking mechanisms 25 to 28). That is, in accordance with the magnitude of the pitch rate Θp obtained as the motion state quantity of the vehicle Ve in the step S11, when the absolute value of the pitch rate Θp is a predetermined pitch rate Θpo (absolute value) or greater, for example, the electronic control unit 30 determines that there is the need to execute the pitch control and thus makes an affirmative determination "Yes" to continue to step S13. On the other hand, when the absolute value of the pitch rate Θp is smaller than the predetermined pitch rate Θpo (absolute value), the electronic control unit 30 determines that there is no need to execute the pitch control and thus makes a negative determination "No" to continue to step S15.

Figure 5:
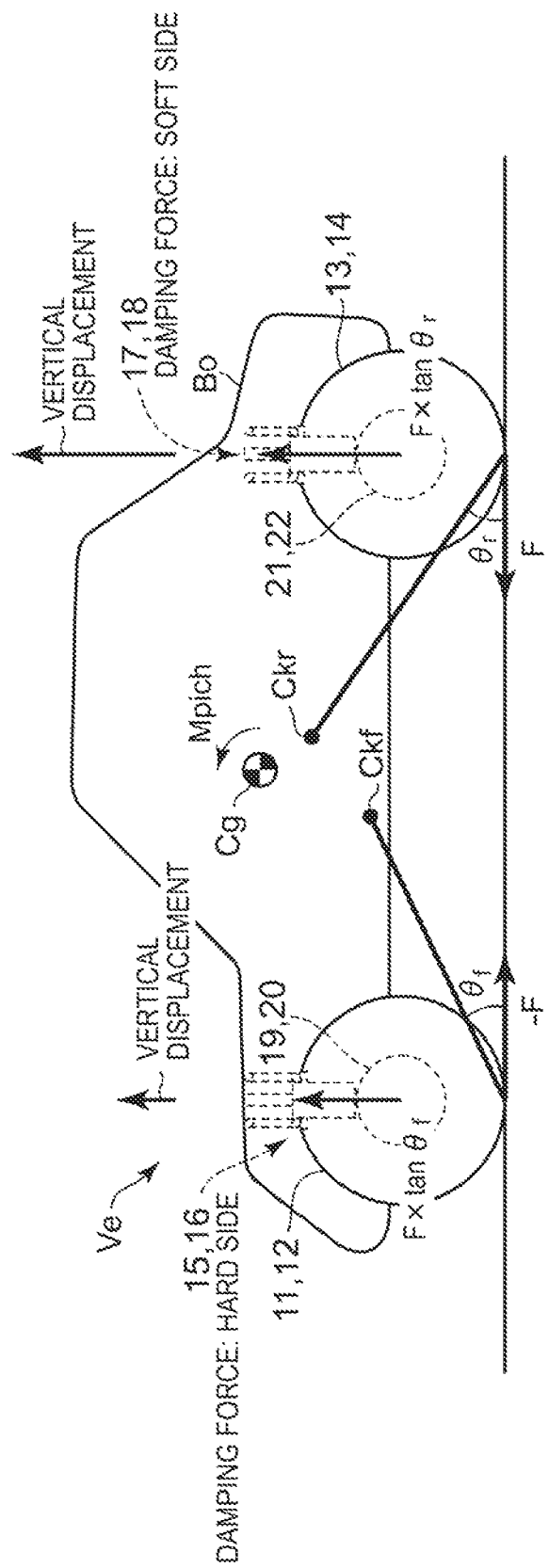
FIG. 5 is a schematic diagram that illustrates a state of the vehicle when the pitch control is performed in accordance with the driving force and damping force cooperative control program in FIG. 4.

In step S13, the electronic control unit 30 determines the driving forces F of the respective in-wheel motors 19 to 22 for generating the pitch moment Mpich on the vehicle body Bo as described above, so as to respond to the pitch rate Θp obtained in the step S11, or in other words, to suppress the pitch behavior occurring on the vehicle body Bo (vehicle Ve). Specifically, as shown in FIG. 5 for example, the electronic control unit 30 determines the driving force F generated by each of the in-wheel motors 19, 20 on the side of the right and left front wheels 11, 12 and the in-wheel motors 21, 22 on the side of the right and left rear wheels 13, 14 to respond to the pitch rate Θp, or in other words, to determine F×tan θf and F×tan θr for suppressing the pitch behavior occurring on the vehicle body Bo (vehicle Ve).

The electronic control unit 30 then controls the driving force of the in-wheel motors 19 to 22 through the inverter 23 in accordance with the driving force F determined above so as to generate F×tan θf and F×tan θr for suppressing the pitch behavior on the vehicle body Bo (vehicle Ve). After controlling the driving force of the in-wheel motors 19 to 22, that is, executing the pitch control in this way, the electronic control unit 30 continues to step S14.

In step S14, the electronic control unit 30 changes the damping force (more specifically, the damping coefficient) of the shock absorbers 15b to 18b in the suspension mechanisms 15 to 18 in response to the executing pitch control, that is, in cooperation with the driving force control. A detailed description is hereinafter made on the change in the damping coefficient in response to this pitch control.

First, a description is made in a case where the degree of the instantaneous rotation angle θf for the suspension mechanisms 15, 16 of the right and left front wheels 11, 12 is smaller than the degree of the instantaneous rotation angle θr for the suspension mechanisms 17, 18 of the right and left rear wheels 13, 14, that is, the magnitude of F×tan θf is smaller than the magnitude of F×tan θr. In this case, as shown in FIG. 5, the electronic control unit 30 suppresses the vertical displacement of the vehicle body Bo on the side of the right and left front wheels 11, 12 and enhances the vertical displacement of the vehicle body Bo on the side of the right and left rear wheels 13, 14 to generate an appropriate pitch moment Mpich.

Thus, as shown in FIG. 5, the electronic control unit 30 changes the damping coefficient Cf (damping force) of the shock absorbers 15b, 16b in the suspension mechanisms 15, 16 of the right and left front wheels 11, 12 to the hard side by adding the damping coefficient change amount Cfp to the damping coefficient Cfo predetermined in response to the travelling state of the vehicle Ve. Specifically, the electronic control unit 30 determines the damping coefficient change amount Cfp as (+ΔCfp) and changes the damping coefficient Cf (damping force) of the shock absorbers 15b, 16b to the hard side. Here, ΔCfp is an arbitrary damping coefficient control amount that is set as a positive value.

On the other hand, as shown in FIG. 5, the electronic control unit 30 changes the damping coefficient Cr (damping force) of the shock absorbers 17b, 18b in the suspension mechanisms 17, 18 of the right and left rear wheels 13, 14 to the soft side by subtracting the damping coefficient change amount Crp from the damping coefficient Cro predetermined in response to the travelling state of the vehicle Ve. Specifically, the electronic control unit 30 determines the damping coefficient change amount Crp as (−ΔCrp) and changes the damping coefficient Cr (damping force) of the shock absorbers 17b, 18b to the soft side. Alternatively, in this case, the electronic control unit 30 determines the damping coefficient change amount Crp as "0" to hold the damping coefficient Cro and maintains the damping coefficient Cr (damping force) of the shock absorbers 17b, 18b to a relatively soft side to the side of the right and left front wheels 11, 12. Here, ΔCrp is an arbitrary damping coefficient control amount that is set as a positive value.

Next, a description is made in a case where the degree of the instantaneous rotation angle θr for the suspension mechanisms 17, 18 of the right and left rear wheels 13, 14 is smaller than the degree of the instantaneous rotation angle θf for the suspension mechanisms 15, 16 of the right and left front wheels 11, 12, that is, the magnitude of F×tan θr is smaller than the magnitude of F×tan θf. In this case, the electronic control unit 30 changes the damping coefficient Cr (damping force) of the shock absorbers 17b, 18b in the suspension mechanisms 17, 18 of the right and left rear wheels 13, 14 to the hard side by adding the damping coefficient change amount Crp to the damping coefficient Cro. That is, the electronic control unit 30 determines the damping coefficient change amount Crp as (+ΔCrp).

On the other hand, the electronic control unit 30 changes the damping coefficient Cf (damping force) of the shock absorbers 15b, 16b in the suspension mechanisms 15, 16 of the right and left front wheels 11, 12 to the soft side by subtracting the damping coefficient change amount Cfp from the damping coefficient Cfo. That is, the electronic control unit 30 determines the damping coefficient change amount Cfp as (−ΔCfp). Alternatively, in this case, the electronic control unit 30 determines the damping coefficient change amount Cfp as "0" to hold the damping coefficient Cfo and maintains the damping coefficient Cf (damping force) of the shock absorbers 15b, 16b to a relatively soft side to the side of the right and left rear wheels 13, 14. The electronic control unit 30 determines the damping coefficient control amounts ΔCfp, ΔCrp as the damping coefficient change amounts Cfp, Crp, changes (or maintains) the damping coefficients Cf, Cr of the shock absorbers 15b to 18b constituting the suspension mechanisms 15 to 18, and then continues to step S17.

Meanwhile, when making the negative determination "No" in the step S12, the electronic control unit 30 continues to step S15. In step S15, the electronic control unit 30 determines that the absolute value of the pitch rate Θp obtained in the step S11 is smaller than the predetermined pitch rate Θpo (absolute value) and thus stops the execution of the pitch control. After stopping the execution of the pitch control, the electronic control unit 30 continues to step S16.

In step S16, the electronic control unit 30 determines each of the damping coefficient change amounts Cfp, Crp of the shock absorbers 15b to 18b as "0" with respect to the damping coefficients Cf, Cr of the shock absorbers 15b to 18b in the suspension mechanisms 15 to 18. The electronic control unit 30 determines each of the damping coefficient change amounts Cfp, Crp as "0", changes (or maintains) the damping coefficients Cf, Cr of the shock absorbers 15b to 18b constituting the suspension mechanisms 15 to 18, and then continues to step S17.

In step S17, the electronic control unit 30 determines whether or not there is a need to execute the heave control by the driving force or the braking force in the wheels 11 to 14, specifically, the driving force or the braking force of the in-wheel motors 19 to 22 (or the braking force of the braking mechanisms 25 to 28). That is, in accordance with the magnitude of the vertical acceleration G obtained as the motion state quantity of the vehicle Ve in the step S11, when the absolute value of the vertical acceleration G is a predetermined vertical acceleration Go (absolute value) or greater, for example, the electronic control unit 30 determines that there is the need to execute the heave control and thus makes an affirmative determination "Yes" to continue to step S18. On the other hand, when the absolute value of the vertical acceleration G is smaller than the predetermined vertical acceleration Go (absolute value), the electronic control unit 30 determines that there is no need to execute the heave control and thus makes a negative determination "No" to continue to step S20.

Figure 6:
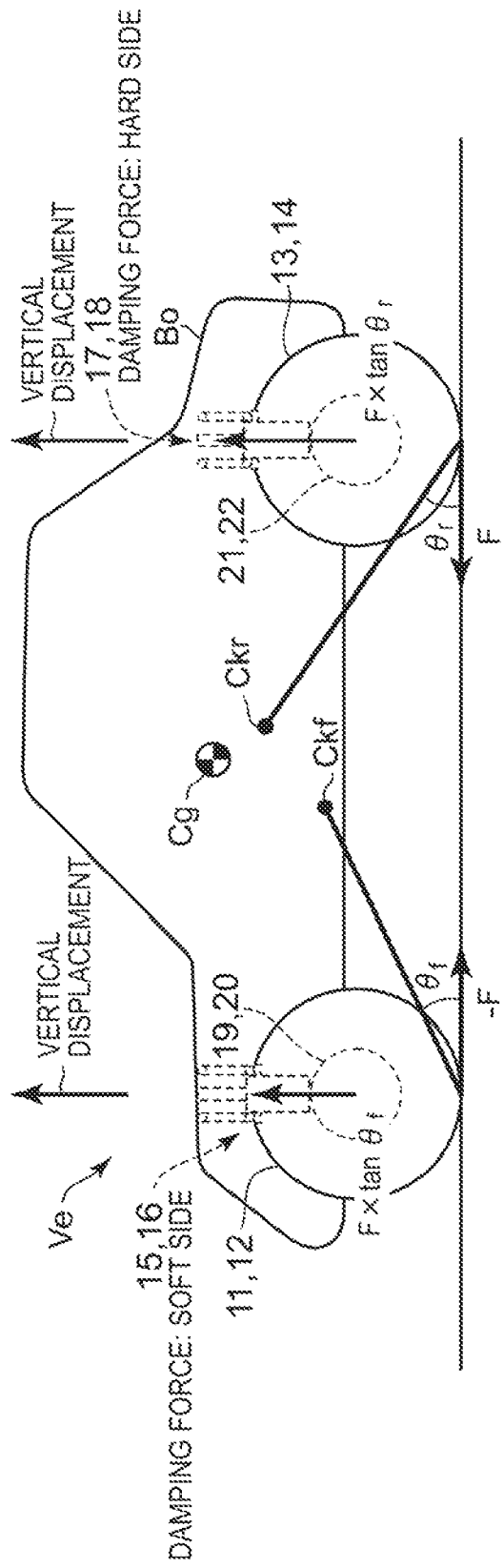
FIG. 6 is a schematic diagram that illustrates a state of the vehicle when the heave control is performed in accordance with the driving force and damping force cooperative control program in FIG. 4.

In step S18, the electronic control unit 30 determines the driving forces F (or the braking force F) of the respective in-wheel motors 19 to 22 for generating, for example, the vertical vibration having the opposite phase to the vertical vibration on the vehicle body Bo in order to reduce the vertical acceleration G generated on the vehicle body Bo that is sprung member as described above, so as to respond to the vertical acceleration G obtained in the step S11, or in other words, to suppress the heave behavior occurring on the vehicle body Bo (vehicle Ve). Specifically, as shown in FIG. 6 for example, the electronic control unit 30 determines the driving force F or the braking force F generated by each of the in-wheel motors 19, 20 on the side of the right and left front wheels 11, 12 and the in-wheel motors 21, 22 on the side of the right and left rear wheels 13, 14 to reduce the vertical acceleration G, or in other words, to determine F×tan θf and F×tan θr for suppressing the heave behavior occurring on the vehicle body Bo (vehicle Ve).

The electronic control unit 30 then controls the driving force of the in-wheel motors 19 to 22 through the inverter 23 in accordance with the driving force F or the braking force F determined above so as to generate F×tan θf and F×tan θr for suppressing the heave behavior on the vehicle body Bo (vehicle Ve). After controlling the driving force of the in-wheel motors 19 to 22, that is, executing the heave control in this way, the electronic control unit 30 continues to step S19.

In step S19, the electronic control unit 30 changes the damping force (more specifically, the damping coefficient) of the shock absorbers 15b to 18b in the suspension mechanisms 15 to 18 in response to the executing heave control, that is, in cooperation with the driving force control. A detailed description is hereinafter made on the change in the damping coefficient in this heave control.

First, a description is made in a case where the degree of the instantaneous rotation angle θf for the suspension mechanisms 15, 16 of the right and left front wheels 11, 12 is smaller than the degree of the instantaneous rotation angle θr for the suspension mechanisms 17, 18 of the right and left rear wheels 13, 14, that is, the magnitude of F×tan θf is smaller than the magnitude of F×tan θr. In this case, as shown in FIG. 6, the electronic control unit 30 enhances the vertical displacement of the vehicle body Bo on the side of the right and left front wheels 11, 12 and suppresses the vertical displacement of the vehicle body Bo on the side of the right and left rear wheels 13, 14 to make the vertical displacement of the vehicle body Bo on the side of the right and left front wheels 11, 12 and the side of the right and left rear wheels 13, 14 approximately identical with each other.

Thus, as shown in FIG. 6, the electronic control unit 30 changes the damping coefficient Cf (damping force) of the shock absorbers 15b, 16b in the suspension mechanisms 15, 16 of the right and left front wheels 11, 12 to the soft side by subtracting the damping coefficient change amount Cfh from the predetermined damping coefficient Cfo. Specifically, the electronic control unit 30 determines the damping coefficient change amount Cfh as (−ΔCfh) and changes the damping coefficient Cf (damping force) of the shock absorbers 15b, 16b to the soft side. Here, ΔCfh is an arbitrary damping coefficient control amount that is set as a positive value.

On the other hand, as shown in FIG. 6, the electronic control unit 30 changes the damping coefficient Cr (damping force) of the shock absorbers 17b, 18b in the suspension mechanisms 17, 18 of the right and left rear wheels 13, 14 to the hard side by adding the damping coefficient change amount Crh to the predetermined damping coefficient Cro. Specifically, the electronic control unit 30 determines the damping coefficient change amount Crh as (+ΔCrh) and changes the damping coefficient Cr (damping force) of the shock absorbers 17b, 18b to the hard side. Here, ΔCrh is an arbitrary damping coefficient control amount that is set as a positive value.

Next, a description is made in a case where the degree of the instantaneous rotation angle θr for the suspension mechanisms 17, 18 of the right and left rear wheels 13, 14 is smaller than the degree of the instantaneous rotation angle θf for the suspension mechanisms 15, 16 of the right and left front wheels 11, 12, that is, the magnitude of F×tan θr is smaller than the magnitude of F×tan θf. In this case, the electronic control unit 30 changes the damping coefficient Cr (damping force) of the shock absorbers 17b, 18b in the suspension mechanisms 17, 18 of the right and left rear wheels 13, 14 to the soft side by subtracting the damping coefficient change amount Crh from the damping coefficient Cro. That is, the electronic control unit 30 determines the damping coefficient change amount Crh as (−ΔCrh).

On the other hand, the electronic control unit 30 changes the damping coefficient Cf (damping force) of the shock absorbers 15b, 16b in the suspension mechanisms 15, 16 of the right and left front wheels 11, 12 to the hard side by adding the damping coefficient change amount Cfh to the damping coefficient Cfo. That is, the electronic control unit 30 determines the damping coefficient change amount Cfh as (+ΔCfh). The electronic control unit 30 determines the damping coefficient control amounts ΔCfh, ΔCrh as the damping coefficient change amounts Cfh, Crh, changes the damping coefficients Cf, Cr of the shock absorbers 15b to 18b constituting the suspension mechanisms 15 to 18, and then continues to step S22.

Meanwhile, when making the negative determination "No" in the step S17, the electronic control unit 30 continues to step S20. In step S20, the electronic control unit 30 determines that the absolute value of the vertical acceleration G obtained in the step S11 is smaller than the predetermined vertical acceleration Go (absolute value) and thus stops the execution of the heave control. After stopping the execution of the heave control, the electronic control unit 30 continues to step S21.

In step S21, the electronic control unit 30 determines each of the damping coefficient change amounts Cfh, Crh of the shock absorbers 15b to 18b as "0" with respect to the damping coefficients Cf, Cr of the shock absorbers 15b to 18b in the suspension mechanisms 15 to 18. The electronic control unit 30 determines each of the damping coefficient change amounts Cfh, Crh as "0", changes the damping coefficients Cf, Cr of the shock absorbers 15b to 18b constituting the suspension mechanisms 15 to 18, and then continues to step S22.

In step S22, the electronic control unit 30 executes the change control of the damping coefficients Cf, Cr (damping force) of the shock absorbers 15b to 18b in the suspension mechanisms 15 to 18. When it is explained in concrete terms, in step S22, the electronic control unit 30 calculates the final damping coefficient Cf of the shock absorbers 15b, 16b in the suspension mechanisms 15, 16 of the right and left front wheels 11, 12 according to the following equation 2 and also calculates the final damping coefficient Cr of the shock absorbers 17b, 18b in the suspension mechanisms 17, 18 of the right and left rear wheels 13, 14 according to the following equation 3.

$$Cf = Cfo + Cfp + Cfh \quad \text{Equation 2}$$

$$Cr = Cro + Crp + Crh \quad \text{Equation 3}$$

The electronic control unit 30 calculates a required damping force for shock absorbers 15b to 18b by well-known calculation methods by using the final damping coefficients Cf, Cr calculated according to the equations 2, 3 and, for example, stroke speed of the shock absorbers 15b to 18b. Then, the electronic control unit 30 determines the valve opening OP that corresponds to the required damping force which is calculated and changes the flow passage cross sectional areas of the communication passages 15b3 to 18b3 formed in the pistons 15b2 to 18b2 of the shock absorbers 15b to 18b in a stepwise manner (or in a linear manner).

When the valve opening OP is determined as described above, the electronic control unit 30 outputs the signal corresponding to the determined valve opening OP to the actuators 15c2 to 18c2 of the variable restriction mechanisms 15c to 18c through a drive circuit which is not illustrated in the drawings. In this way, the actuators 15c2 to 18c2 operate the respective valves 15c1 to 18c1 so as to correspond to the determined valve opening OP based on the output signal. After operating the respective valves 15c1 to 18c1 to control the damping force by the shock absorbers 15b to 18b, the electronic control unit 30 returns the process to the step S11 and again executes the step processes after the step S11.

This allows the shock absorbers 15b to 18b to generate the damping force closest to the required damping force (or the damping force in agreement with the required damping force). As a result, the magnitude of F×tan θf and the magnitude of F×tan θr acting on the vehicle body Bo through the shock absorbers 15b to 18b as the component of the driving force F of the in-wheel motors 19 to 22 at the locations of the wheels 11 to 14, or in other words, the vertical displacement in the vehicle body Bo can be optimized, and as shown in FIG. 5 and FIG. 6, the pitch behavior and the heave behavior can be controlled appropriately.

As seen from the above description, according to this embodiment, the electronic control unit 30 can generate the driving force F (or braking force F) independently in the right and left front wheels 11, 12 and right and left rear wheels 13, 14 by controlling the drive of the in-wheel motors 19 to 22 in response to the behavior of the vehicle body Bo, specifically, in order to suppress the pitch behavior or the heave behavior occurring on the vehicle body Bo. This allows the electronic control unit 30 to generate F×tan θf and F×tan θr as the vertical forces acting on the vehicle body Bo from the right and left front wheels 11, 12 and the right and left rear wheels 13, 14 in response to the behavior (pitch behavior or heave behavior) occurring on the vehicle body Bo.

Meanwhile, the electronic control unit 30 can change the damping coefficients Cf, Cr (damping force) of the shock absorbers 15b to 18b in the suspension mechanisms 15 to 18 in response to the behavior (pitch behavior or heave behavior) occurring on the vehicle body Bo or in accordance with the magnitude of F×tan θf and F×tan θr as the vertical forces. In this way, the electronic control unit 30 can appropriately control the magnitude of the vertical forces (F×tan θf and F×tan θr) acting on the vehicle body Bo through the shock absorbers 15b to 18b in the suspension mechanisms 15 to 18 and can consequently control the vertical displacement in the vehicle body Bo.

Therefore, in the situation where the driving forces F (or braking forces F) having the identical absolute value and the opposite directions of action are generated on the side of the right and left front wheels 11, 12 and the side of the right and left rear wheels 13, 14 and the behavior of the vehicle body Bo is controlled, even when the differences in the magnitude of the vertical force (F×tan θf and F×tan θr) generated on the wheels 11 to 14 arise due to the characteristics of the suspension mechanisms 15 to 18, the electronic control unit 30 can appropriately change the magnitude of the damping coefficients Cf, Cr (damping force) of the shock absorbers 15b to 18b in accordance with the magnitude of the vertical forces (F×tan θf and F×tan θr). In this way, by controlling one of the heave behavior and the pitch behavior occurring in combination (for example, the heave behavior), enhancing of the occurrence of the other one (for example, the pitch behavior) that is not intended can be prevented effectively, and the occurrence of intended behavior (aimed behavior) can be made on the vehicle body Bo. That is, even when the behaviors interact with each other, the intended behavior (aimed behavior) can be controlled independently.

In the embodiment described above, all of the suspension mechanisms 15, 16 of the right and left front wheels 11, 12 and the suspension mechanism 17, 18 of the right and left rear wheels 13, 14 include the variable restriction mechanisms 15c to 18c, and the damping coefficients Cf, Cr (damping force) of the shock absorbers 15b to 18b are changed in the wheels 11 to 14, that is, all wheels in response to the valve opening OP.

In this case, the present invention can be carried out such that, instead of all of the suspension mechanisms 15 to 18 of four wheels, which are the right and left front wheels 11, 12 and right and left rear wheels 13, 14, including the variable restriction mechanisms 15c to 18c, only the suspension mechanisms 15, 16 of the right and left front wheels 11, 12 may include the variable restriction mechanisms 15c, 16c, that is, the damping coefficient Cf (damping force) of only the shock absorbers 15b, 16b can be changed, or only the suspension mechanism 17, 18 of the right and left rear wheels 13, 14 may include the variable restriction mechanisms 17c, 18c, that is, the damping coefficient Cr (damping force) of only the shock absorbers 17b, 18b can be changed. In this modification, the structure can be simplified, and the same effect as the embodiment described above can be expected.

Specifically, a description is made in the case where the degree of the instantaneous rotation angle θf for the suspension mechanisms 15, 16 of the right and left front wheels 11, 12 is smaller than the degree of the instantaneous rotation angle θr for the suspension mechanisms 17, 18 of the right and left rear wheels 13, 14. In the pitch control in this case, as described in the aforementioned embodiment, the electronic control unit 30 suppresses the vertical displacement of the vehicle body Bo on the side of the right and left front wheels 11, 12 and enhances the vertical displacement of the vehicle body Bo on the side of the right and left rear wheels 13, 14 to generate an appropriate pitch moment Mpich. Furthermore, in the heave control in this case, as described in the aforementioned embodiment, the electronic control unit 30 enhances the vertical displacement of the vehicle body Bo on the side of the right and left front wheels 11, 12 and suppresses the vertical displacement of the vehicle body Bo on the side of the right and left rear wheels 13, 14 to make the vertical displacement of the vehicle body Bo on the side of the right and left front wheels 11, 12 and the side of the right and left rear wheels 13, 14 approximately identical with each other.

Incidentally, in this modification, among the suspension mechanisms 15 to 18, the damping coefficient Cf (damping force) of only the shock absorbers 15b, 16b in the suspension mechanisms 15, 16 can be changed, or the damping coefficient Cr (damping force) of only the shock absorbers 17b, 18b in the suspension mechanisms 17, 18 can be changed. Thus, in the pitch control in this modification, there are some slight differences from the embodiment described above in which the electronic control unit 30 reduces the vertical displacement of the vehicle body Bo on the side of the right and left front wheels 11, 12 relative to the vertical displacement of the vehicle body Bo on the side of the right and left rear wheels 13, 14 or increases the vertical displacement of the vehicle body Bo on the side of the right and left rear wheels 13, 14 relative to the vertical displacement of the vehicle body Bo on the side of the right and left front wheels 11, 12 to generate the pitch moment Mpich. Furthermore, in the heave control in this modification, there are some slight differences from the embodiment described above in which the electronic control unit 30 increases the vertical displacement of the vehicle body Bo on the side of the right and left front wheels 11, 12 relative to the vertical displacement of the vehicle body Bo on the side of the right and left rear wheels 13, 14 or reduces the vertical displacement of the vehicle body Bo on the side of the right and left rear wheels 13, 14 relative to the vertical displacement of the vehicle body Bo on the side of the right and left front wheels 11, 12 to make the vertical displacement of the vehicle body Bo on the side of the right and left front wheels 11, 12 and the side of the right and left rear wheels 13, 14 approximately identical with each other.

Thus, when the damping coefficient Cf (damping force) of only the shock absorbers 15b, 16b in the suspension mechanisms 15, 16 can be changed, the electronic control unit 30 changes the damping coefficient Cf of the shock absorbers 15b, 16b to the hard side and reduces the vertical displacement of the vehicle body Bo on the side of the right and left front wheels 11, 12 relative to the vertical displacement of the vehicle body Bo on the side of the right and left rear wheels 13, 14 in the pitch control. In this way, the electronic control unit 30 can generate the appropriate pitch moment Mpich just like the embodiment described above by suppressing the vertical displacement of the vehicle body Bo on the side of the right and left front wheels 11, 12. On the other hand, in the heave control, the electronic control unit 30 changes the damping coefficient Cf of the shock absorbers 15b, 16b to the soft side and increases the vertical displacement of the vehicle body Bo on the side of the right and left front wheels 11, 12 relative to the vertical displacement of the vehicle body Bo on the side of the right and left rear wheels 13, 14. In this way, the electronic control unit 30 can make the vertical displacement of the vehicle body Bo on the side of the right and left front wheels 11, 12 and the side of the right and left rear wheels 13, 14 approximately identical with each other just like the embodiment described above by enhancing the vertical displacement of the vehicle body Bo on the side of the right and left front wheels 11, 12.

Conversely, when the damping coefficient Cr (damping force) of only the shock absorbers 17b, 18b in the suspension mechanisms 17, 18 can be changed, the electronic control unit 30 changes the damping coefficient Cr of the shock absorbers 17b, 18b to the soft side and increases the vertical displacement of the vehicle body Bo on the side of the right and left rear wheels 13, 14 relative to the vertical displacement of the vehicle body Bo on the side of the right and left front wheels 11, 12 in the pitch control. In this way, the electronic control unit 30 can generate the appropriate pitch moment Mpich just like the embodiment described above by enhancing the vertical displacement of the vehicle body Bo on the side of the right and left rear wheels 13, 14. On the other hand, in the heave control, the electronic control unit 30 changes the damping coefficient Cr of the shock absorbers 17b, 18b to the hard side and reduces the vertical displacement of the vehicle body Bo on the side of the right and left rear wheels 13, 14 relative to the vertical displacement of the vehicle body Bo on the side of the right and left front wheels 11, 12. In this way, the electronic control unit 30 can make the vertical displacement of the vehicle body Bo on the side of the right and left front wheels 11, 12 and the side of the right and left rear wheels 13, 14 approximately identical with each other just like the embodiment described above by suppressing the vertical displacement of the vehicle body Bo on the side of the right and left rear wheels 13, 14.

Next, a description is made in the case where the degree of the instantaneous rotation angle θr for the suspension mechanisms 17, 18 of the right and left rear wheels 13, 14 is smaller than the degree of the instantaneous rotation angle θf for the suspension mechanisms 15, 16 of the right and left front wheels 11, 12. In the pitch control in this case, as described in the aforementioned embodiment, the electronic control unit 30 enhances the vertical displacement of the vehicle body Bo on the side of the right and left front wheels 11, 12 and suppresses the vertical displacement of the vehicle body Bo on the side of the right and left rear wheels 13, 14 to generate the appropriate pitch moment Mpich. Furthermore, in the heave control in this case, as described in the aforementioned embodiment, the electronic control unit 30 suppresses the vertical displacement of the vehicle body Bo on the side of the right and left front wheels 11, 12 and enhances the vertical displacement of the vehicle body Bo on the side of the right and left rear wheels 13, 14 to make the vertical displacement of the vehicle body Bo on the side of the right and left front wheels 11, 12 and the side of the right and left rear wheels 13, 14 approximately identical with each other.

In this modification here, among the suspension mechanisms 15 to 18, the damping coefficient Cf (damping force) of only the shock absorbers 15b, 16b in the suspension mechanisms 15, 16 can be changed, or the damping coefficient Cr (damping force) of only the shock absorbers 17b, 18b in the suspension mechanisms 17, 18 can be changed. Thus, in the pitch control in this modification, there are some slight differences from the embodiment described above in which the electronic control unit 30 increases the vertical displacement of the vehicle body Bo on the side of the right and left front wheels 11, 12 relative to the vertical displacement of the vehicle body Bo on the side of the right and left rear wheels 13, 14 or reduces the vertical displacement of the vehicle body Bo on the side of the right and left rear wheels 13, 14 relative to the vertical displacement of the vehicle body Bo on the side of the right and left front wheels 11, 12 to generate the pitch moment Mpich. Furthermore, in the heave control in this modification, there are some slight differences from the embodiment described above in which the electronic control unit 30 reduces the vertical displacement of the vehicle body Bo on the side of the right and left front wheels 11, 12 relative to the vertical displacement of the vehicle body Bo on the side of the right and left rear wheels 13, 14 or increases the vertical displacement of the vehicle body Bo on the side of the right and left rear wheels 13, 14 relative to the vertical displacement of the vehicle body Bo on the side of the right and left front wheels 11, 12 to make the vertical displacement of the vehicle body Bo on the side of the right and left front wheels 11, 12 and the side of the right and left rear wheels 13, 14 identical with each other.

Thus, when the damping coefficient Cf (damping force) of only the shock absorbers 15b, 16b in the suspension mechanisms 15, 16 can be changed, the electronic control unit 30 changes the damping coefficient Cf of the shock absorbers 15b, 16b to the soft side and increases the vertical displacement of the vehicle body Bo on the side of the right and left front wheels 11, 12 relative to the vertical displacement of the vehicle body Bo on the side of the right and left rear wheels 13, 14 in the pitch control. In this way, the electronic control unit 30 can generate the appropriate pitch moment Mpich just like the embodiment described above by enhancing the vertical displacement of the vehicle body Bo on the side of the right and left front wheels 11, 12. On the other hand, in the heave control, the electronic control unit 30 changes the damping coefficient Cf of the shock absorbers 15b, 16b to the hard side and reduces the vertical displacement of the vehicle body Bo on the side of the right and left front wheels 11, 12 relative to the vertical displacement of the vehicle body Bo on the side of the right and left rear wheels 13, 14. In this way, the electronic control unit 30 can make the vertical displacement of the vehicle body Bo on the side of the right and left front wheels 11, 12 and the side of the right and left rear wheels 13, 14 approximately identical with each other just like the embodiment described above by suppressing the vertical displacement of the vehicle body Bo on the side of the right and left front wheels 11, 12.

Conversely, when the damping coefficient Cr (damping force) of only the shock absorbers 17b, 18b in the suspension mechanisms 17, 18 can be changed, the electronic control unit 30 changes the damping coefficient Cr of the shock absorbers 17b, 18b to the hard side and reduces the vertical displacement of the vehicle body Bo on the side of the right and left rear wheels 13, 14 relative to the vertical displacement of the vehicle body Bo on the side of the right and left front wheels 11, 12 in the pitch control. In this way, the electronic control unit 30 can generate the appropriate pitch moment Mpich just like the embodiment described above by suppressing the vertical displacement of the vehicle body Bo on the side of the right and left rear wheels 13, 14. On the other hand, in the heave control, the electronic control unit 30 changes the damping coefficient Cr of the shock absorbers 17b, 18b to the soft side and increases the vertical displacement of the vehicle body Bo on the side of the right and left rear wheels 13, 14 relative to the vertical displacement of the vehicle body Bo on the side of the right and left front wheels 11, 12. In this way, the electronic control unit 30 can make the vertical displacement of the vehicle body Bo on the side of the right and left front wheels 11, 12 and the side of the right and left rear wheels 13, 14 approximately identical with each other just like the embodiment described above by suppressing the vertical displacement of the vehicle body Bo on the side of the right and left rear wheels 13, 14.

As seen from the above description, the modification described above is configured to change only one of the damping coefficient Cf (damping force) of the shock absorbers 15b, 16b in the suspension mechanisms 15, 16 on the side of the right and left front wheels 11, 12 and the damping coefficient Cr (damping force) of the shock absorbers 17b, 18b in the suspension mechanisms 17, 18 on the side of the right and left rear wheels 13, 14. In this way, although there are some cases where the controlling accuracy for the vertical displacement of the vehicle body Bo is slightly lower than the embodiment described above, the structure of the modification can be simplified and the same effect as the embodiment described above can be achieved.

In practicing, the present invention is not limited to the embodiment and the modification described above, and various changes are permissible without departing from the scope of the present invention.

For example, the embodiment and the modification described above are carried out such that the in-wheel motors 19 to 22 as the braking and driving force generating mechanisms are respectively incorporated into the wheels 11 to 14. In this case, if each of the wheels 11 to 14 can independently generate the driving force (or braking force), the present invention is not limited to the incorporation of the braking and driving force generating mechanisms into the wheels 11 to 14, and any structure may be employed.

Specifically, in this case, it is possible to employ the structure that generates the driving force (or braking force) on the wheels 11 to 14 by providing a specified rotational force to each axle (unsprung member) independently where the braking and driving force generating mechanism supports each of the wheels 11 to 14 for rotation. However, when such a modified structure is employed, the instantaneous rotation angles θf, θr described in the embodiment and the modification described above are angles formed by a line segment connecting the center points of the axles supporting the wheels 11 to 14 and the instantaneous centers of rotation Ckf, Ckr of the suspension mechanisms 15 to 18 and a horizontal line. By executing the pitch control and the heave control using the instantaneous rotation angle θf and the instantaneous rotation angle θr, the same effect as the embodiment and the modification described above can be achieved.

Furthermore, the embodiment and the modification described above are carried out such that the driving force F (or braking force F) generated by the in-wheel motors 19, 20 on the side of the right and left front wheels 11, 12 and the driving force F (or braking force F) generated by the in-wheel motors 21, 22 on the side of the right and left rear wheels 13, 14 have the directions opposite to each other and the absolute values identical with each other. This results in cancelling of the driving forces F (or braking forces F) generated on the side of the right and left front wheels 11, 12 and the side of the right and left rear wheels 13, 14 each other, and therefore the total driving force required to drive the vehicle Ve is prevented from decreasing. That is, in this case, it is carried out such that the driving force F (or braking force F) generated by the in-wheel motors 19, 20 on the side of the right and left front wheels 11, 12 and the driving force F (or braking force F) generated by the in-wheel motors 21, 22 on the side of the right and left rear wheels 13, 14 respectively satisfy the ratio of distribution of 1:1.

However, depending on the behavior of the vehicle body Bo (vehicle Ve) for example, in order to control the behavior, there is a situation where the magnitudes of the driving forces (or braking forces) are distributed in accordance with a specified ratio so that the in-wheel motors 19, 20 on the side of the right and left front wheels 11, 12 generates the driving force F (or braking force F) and the in-wheel motors 21, 22 on the side of the right and left rear wheels 13, 14 generates the driving force F' (or braking force F'). In this case, for example, the vertical component of the driving force F acting on the vehicle body Bo from the side of the right and left front wheels 11, 12 is expressed as F×tan θf and the vertical component of the driving force F' acting on the vehicle body Bo from the side of the right and left rear wheels 13, 14 is expressed as F'×tan θr.

Incidentally, in the case where F×tan θf and F'×tan θr that are the vertical components of the driving force F (or braking force F) and the driving force F' (or braking force F') are input from the right and left front wheels 11, 12 and the right and left rear wheels 13, 14 to the vehicle body Bo as vertical forces, at the time of the execution of the pitch control when the magnitude of F×tan θf is greater than the magnitude of F'×tan θr, for example, the electronic control unit 30 can change the damping coefficient Cf (damping force) of the shock absorbers 15b, 16b in the suspension mechanisms 15, 16 on the side of the right and left front wheels 11, 12 to a harder side by changing it to a greater value, for example, in order to suppress the vertical displacement of the vehicle body Bo on the side of the right and left front wheels 11, 12. Furthermore, at the time of the execution of the heave control when the magnitude of F'×tan θr is greater than the magnitude of F×tan θf, for example, the electronic control unit 30 can change the damping coefficient Cr (damping force) of the shock absorbers 17b, 18b in the suspension mechanisms 17, 18 on the side of the right and left rear wheels 13, 14 to a harder side by changing it to a greater value, for example, in order to suppress the vertical displacement of the vehicle body Bo on the side of the right and left rear wheels 13, 14.

As described above, in accordance with the distribution of the driving force F (or braking force F) generated by the in-wheel motors 19, 20 on the side of the right and left front wheels 11, 12 and the driving force F' (or braking force F') generated by the in-wheel motors 21, 22 on the side of the right and left rear wheels 13, 14, or in other words, the magnitude of F×tan θf and F'×tan θr that are the vertical forces, the electronic control unit 30 can change the damping coefficient Cf (damping force) and the damping coefficient Cr (damping force) of the shock absorbers 15b to 18b in the suspension mechanisms 15 to 18. In this way, when the pitch control or the heave control is executed in order to control the pitch behavior or the heave behavior as the behavior occurring on the vehicle body Bo (vehicle Ve), even if the driving force F (braking force F) generated on the side of the right and left front wheels 11, 12 and the driving force F' (braking force F') generated on the side of the right and left rear wheels 13, 14 are made different from each other, by changing the damping coefficient Cf (damping force) and the damping coefficient Cr (damping force) of the shock absorbers 15b to 18b in the suspension mechanisms 15 to 18, the difference between the driving force F (braking force F) and the driving force F' (braking force F') can be limited to a small value. Therefore, in association with the execution of the pitch control or the heave control, an influence on the forward and backward motion of the vehicle Ve can be minimized, or in other words, the acceleration or deceleration generated in the vehicle Ve can be minimized, and the suppression effect on the pitch behavior or the heave behavior can be exerted more appropriately.

The invention claimed is:

1. A vehicle behavior control apparatus comprising:
   braking and driving force generating mechanisms that generate driving force or braking force independently on at least a front wheel and a rear wheel of a vehicle;
   suspension mechanisms that respectively connect the front wheel and the rear wheel disposed under springs of the vehicle to a vehicle body disposed above the springs of the vehicle; and
   a control portion that controls the braking and driving force generating mechanisms in response to behavior occurring on the vehicle body to generate specified driving force or braking force independently on the front wheel and the rear wheel, wherein
   the suspension mechanisms include: shock absorbers that damp vibrations transmitted from a road surface to the vehicle body through the front wheel and the rear wheel; and damping force changing portion that change damping force of the shock absorbers, and
   the control portion:
   controls the braking and driving force generating mechanisms in response to the behavior occurring on the vehicle body and generates the specified driving force or braking force independently on the front wheel and the rear wheel,
   controls the damping force changing portion in response to the behavior occurring on the vehicle body and changes the damping force of the shock absorbers to specified damping force,
   controls the damping force changing portion in accordance with the magnitude of vertical forces in vehicle vertical directions acting on the vehicle body through the suspension mechanisms as components of the specified driving force or braking force generated on the front wheels and the rear wheels by controlling the braking and driving force generating mechanisms; and changes the damping force of the shock absorbers to the specified damping force,
   controls the braking and driving force generating mechanisms in order to suppress pitch behavior that is the behavior with vertical motion occurring on the vehicle body and in which the direction of vertical displacement of the vehicle body on the side of the front wheels and the direction of vertical displacement on the side of the rear wheels are opposite to each other; and, when the specified driving force or braking force is generated independently on the front wheels and the rear wheels,
   controls the damping force changing portion so as to increase the damping force of the shock absorber in the suspension mechanism transmitting the vertical force having relatively small magnitude and controls the damping force changing portion so as to reduce the damping force of the shock absorber in the suspension mechanism transmitting the vertical force having relatively large magnitude, among the suspension mechanisms transmitting the vertical force acting on the vehicle body.

2. The vehicle behavior control apparatus according to claim 1, wherein
   the suspension mechanisms
   connect respective right and left front wheels and right and left rear wheels of the vehicle to the vehicle body through the shock absorbers, and
   the control portion:
   controls the braking and driving force generating mechanisms in order to suppress the behavior occurring on the vehicle body and generates the specified driving force or braking force independently on the front wheels and the rear wheels; and
   controls the damping force changing portion in accordance with distribution of the specified driving force or braking force generated on the front wheels and the rear wheels by the braking and driving force generating mechanisms and changes the damping force of the shock absorbers to the specified damping force.

3. The vehicle behavior control apparatus according to claim 1, wherein
   the control portion:
   controls the braking and driving force generating mechanisms in order to suppress the behavior occurring on the vehicle body and generates the specified driving force or braking force independently on the front wheels and the rear wheels; and
   controls the damping force changing portion for at least one of the shock absorbers connecting the front wheels to the vehicle body and the shock absorbers connecting the rear wheels to the vehicle body in accordance with distribution of the specified driving force or braking force generated on the front wheels and the rear wheels by the braking and driving force generating mechanisms and changes the damping force of the shock absorbers to the specified damping force.

4. The vehicle behavior control apparatus according to claim 1, wherein
   the control portion:
   controls the braking and driving force generating mechanisms in response to the behavior of the vehicle body and generates the driving force or the braking force having an identical absolute value and opposite directions of action independently on each of the front wheels and the rear wheels.

5. The vehicle behavior control apparatus according to claim 1, wherein
   the braking and driving force generating mechanisms are motors that are each assembled to the front wheel and the rear wheel of the vehicle and independently generate the driving force or the braking force.

6. A vehicle behavior control apparatus comprising: braking and driving force generating mechanisms that generate driving force or braking force independently on at least a front wheel and a rear wheel of a vehicle; suspension mechanisms that respectively connect the front wheel and the rear wheel disposed under springs of the vehicle to a vehicle body disposed above the springs of the vehicle; and control portion that controls the braking and driving force generating mechanisms in response to behavior occurring on the vehicle body to generate specified driving force or braking force independently on the front wheel and the rear wheel, wherein the suspension mechanisms include: shock absorbers that damp vibrations transmitted from a road surface to the vehicle body through the front wheel and the rear wheel; and damping force changing portion that change damping force of the shock absorbers, and the control portion:

controls the braking and driving force generating mechanisms in response to the behavior occurring on the vehicle body and generates the specified driving force or braking force independently on the front wheel and the rear wheel, controls the damping force changing portion in response to the behavior occurring on the vehicle body and changes the damping force of the shock absorbers to specified damping force, controls the damping force changing portion in accordance with the magnitude of vertical forces in vehicle vertical directions acting on the vehicle body through the suspension mechanisms as components of the specified driving force or braking force generated on the front wheels and the rear wheels by controlling the braking and driving force generating mechanisms; and changes the damping force of the shock absorbers to the specified damping force, controls the braking and driving force generating mechanisms in order to suppress heave behavior that is the behavior with vertical motion occurring on the vehicle body and in which the direction of vertical displacement of the vehicle body on the side of the front wheels and the direction of vertical displacement on the side of the rear wheels are identical with each other; and, when the specified driving force or braking force is generated independently on the front wheels and the rear wheels, controls the damping force changing portion so as to reduce the damping force of the shock absorber in the suspension mechanism transmitting the vertical force having relatively small magnitude and controls the damping force changing portion so as to increase the damping force of the shock absorber in the suspension mechanism transmitting the vertical force having relatively large magnitude, among the suspension mechanisms transmitting the vertical force acting on the vehicle body.

7. The vehicle behavior control apparatus according to claim 6, wherein the suspension mechanisms connect respective right and left front wheels and right and left rear wheels of the vehicle to the vehicle body through the shock absorbers, and the control portion:

controls the braking and driving force generating mechanisms in order to suppress the behavior occurring on the vehicle body and generates the specified driving force or braking force independently on the front wheels and the rear wheels; and controls the damping force changing portion in accordance with distribution of the specified driving force or braking force generated on the front wheels and the rear wheels by the braking and driving force generating mechanisms and changes the damping force of the shock absorbers to the specified damping force.

8. The vehicle behavior control apparatus according to claim 6, wherein the control portion:

controls the braking and driving force generating mechanisms in order to suppress the behavior occurring on the vehicle body and generates the specified driving force or braking force independently on the front wheels and the rear wheels; and controls the damping force changing portion for at least one of the shock absorbers connecting the front wheels to the vehicle body and the shock absorbers connecting the rear wheels to the vehicle body in accordance with distribution of the specified driving force or braking force generated on the front wheels and the rear wheels by the braking and driving force generating mechanisms and changes the damping force of the shock absorbers to the specified damping force.

9. The vehicle behavior control apparatus according to claim 6, wherein the control portion:

controls the braking and driving force generating mechanisms in response to the behavior of the vehicle body and generates the driving force or the braking force having an identical absolute value and opposite directions of action independently on each of the front wheels and the rear wheels.

10. The vehicle behavior control apparatus according to claim 6, wherein the braking and driving force generating mechanisms are motors that are each assembled to the front wheel and the rear wheel of the vehicle and independently generate the driving force or the braking force.

* * * * *